United States Patent
Hall et al.

(10) Patent No.: US 10,196,809 B2
(45) Date of Patent: Feb. 5, 2019

(54) MODULAR BUILDING COMPONENT FOR FLOOR AND CEILING WITH ROD-BASED DIMENSIONS

(71) Applicants: David R. Hall, Provo, UT (US); Benjamin Jensen, Provo, UT (US); David Lundgreen, Spanish Fork, UT (US); Joe Fox, Spanish Fork, UT (US)

(72) Inventors: David R. Hall, Provo, UT (US); Benjamin Jensen, Provo, UT (US); David Lundgreen, Spanish Fork, UT (US); Joe Fox, Spanish Fork, UT (US)

(73) Assignee: Hall Labs LLC, Provo, UT (US)

( * ) Notice: Subject to any disclaimer, the term of this patent is extended or adjusted under 35 U.S.C. 154(b) by 0 days.

(21) Appl. No.: 15/621,143

(22) Filed: Jun. 13, 2017

(65) Prior Publication Data

US 2018/0355603 A1    Dec. 13, 2018

(51) Int. Cl.
| | |
|---|---|
| *E04B 1/343* | (2006.01) |
| *B32B 3/26* | (2006.01) |
| *E04B 1/14* | (2006.01) |
| *E04B 5/02* | (2006.01) |

(52) U.S. Cl.
CPC ............ *E04B 1/34321* (2013.01); *B32B 3/26* (2013.01); *E04B 1/14* (2013.01); *E04B 5/023* (2013.01); *E04B 2001/34389* (2013.01)

(58) Field of Classification Search
CPC ......... E04B 1/3483; E04B 2001/34892; E04B 1/343
USPC ......... 52/79.1, 79.7, 79.5, 440, 169.2, 169.3
See application file for complete search history.

(56) References Cited

U.S. PATENT DOCUMENTS

| | | | | |
|---|---|---|---|---|
| 1,618,696 A | * | 2/1927 | Bemis ..................... | E04B 1/161 52/220.2 |
| 2,765,499 A | * | 10/1956 | Couse ................... | E04B 1/3442 296/176 |
| 3,732,649 A | * | 5/1973 | Mehran ..................... | E04H 1/00 52/169.3 |
| 8,910,439 B2 | * | 12/2014 | Ingjaldsdottir ......... | E04C 2/384 52/309.16 |
| 9,631,359 B2 | * | 4/2017 | Malakauskas ...... | E04B 1/34838 |
| 2008/0184658 A1 | * | 8/2008 | Rhodes ................. | E04G 21/161 52/745.2 |
| 2009/0249708 A1 | * | 10/2009 | Zschornack ............ | B64F 1/368 52/79.9 |
| 2012/0279141 A1 | * | 11/2012 | Wiederick ................. | E04H 5/02 52/79.5 |

(Continued)

*Primary Examiner* — Brian E Glessner
*Assistant Examiner* — Daniel J Kenny

(57) ABSTRACT

The invention is a modular building component with rod-based dimensions. The modular building component comprises a prismatic box structure. A number of the prismatic box structures are placed side by side horizontally to create a ceiling and a floor with rod-based dimensions. The ceiling and the floor function as components of a building with rod-based dimensions. The building may also have walls that are also prismatic box structures with rod-based dimensions. Two or more of the buildings can be placed side by side to fill equal portions of an entire width of a perfect-acre lot. The buildings that fill an entire perfect-acre lot lead to a sustainable community design, given that no space is wasted. The rod-based building components are properly dimensioned for quickly assembling these optimally sustainable buildings.

18 Claims, 13 Drawing Sheets

(56) References Cited

U.S. PATENT DOCUMENTS

2016/0251812 A1* 9/2016 Preston .................... E04C 2/00
                                                                                52/185

* cited by examiner

MODULAR BUILDING COMPONENT FOR FLOOR AND CEILING WITH ROD-BASED DIMENSIONS

CROSS-REFERENCES

Technical Field

This invention relates generally to the field of buildings, and more specifically to modular building components.

Background

Environmental damage, social and economic inequalities, and rapid globalization, among other things, make the need for sustainable communities ever more pressing. Years of research have shown the likely success of one model for a sustainable community—a high-density community contained within a slightly-larger-than-one-mile space with equitable land divisions all within walking distance, wide streets, and surrounding areas of open space. In contrast to modern urban sprawl, such a design promotes social cohesion and sustainability. Every square inch of land can be utilized to optimize the use of the space. Nothing is wasted. All open areas can be beneficially used by providing for the agricultural needs of the community.

However, modern building designs are not optimally compatible with such a community design, especially given that the design of most modern buildings leads to large amounts of wasted space, both within building lots and within the buildings. Wasted space within building lots can be eliminated by filling the entire width of each lot with one or more buildings, and then creating a row of interconnected buildings spanning the width of several lots, while leaving large areas of usable open space behind the buildings.

However, one peculiar challenge with trying to eliminate wasted space in this way is that most building lots are measured in acreage, while standard building materials are measured in pre-selected increments of feet. A desire to fill an entire width of a lot measured in acres with buildings that fill equal portions of that acre could lead to awkward trimming if using current building materials. However, acres can be divided evenly into rods, and fractions of rods are nearly equivalent to standard sizes for typical modern building materials. Therefore, building components with rod-based dimensions are desirable.

Furthermore, in order to eliminate wasted space within buildings, current building techniques are not helpful. The most common of current building techniques involve the use of standardized building materials that are shipped individually to a construction site in small pieces and assembled on site. When using such methods, a building or other structure can take months or even years to build. The building project is consequently subjected to unpredictable weather conditions, and great exertions must be made to store and protect tools and resources. Furthermore, efficient modern assembly techniques that have driven down prices for many industrial and consumer products—such as cars, machinery, clothing, and electronics—are not fully taken advantage of by these methods. Finally, large areas of unusable space are created within the building frame. Current methods could improve greatly in precision, efficiency, quality, and optimal timing through the manufacture, in a controlled environment, of modular building segments with usable interior space, such that the segments could then be transported to and quickly assembled on the building site.

In light of the foregoing, what is needed is a modular building component with rod-based dimensions that can be manufactured in a controlled off-site environment and then transported to a building site for a quick building assembly, such that the building, in combination with other similar buildings, can fill the entire width of an acre lot, thereby optimizing space and leading to a green and sustainable community model.

SUMMARY OF THE INVENTION

The disclosed invention has been developed in response to the present state of the art and, in particular, in response to the problems and needs in the art that have not yet been fully solved by currently available components and methods. Accordingly, efficient structural components and methods have been developed to allow for modular building components with rod-based dimensions that optimize the use of space.

Consistent with the foregoing, a modular building component is disclosed. The modular building component comprises a prismatic box structure with length and width dimensions that are multiples of one-half rod. A plurality of the prismatic box structures can be placed side by side horizontally to create a ceiling and a floor with rod-based dimensions. The ceiling and the floor are components of a building with rod-based dimensions. A plurality of the buildings with rod-based dimensions can be placed side by side to fill equal portions of an entire width of a perfect-acre lot. Numerous such buildings may be employed in the creation of a sustainable community.

In one embodiment, each prismatic box structure comprises two or more partitions, which may each contain one or more automatic lifting devices. The one or more automatic lifting devices may lift box frames that comprise floor pieces and sub-floor pieces from positions where they are nesting removably inside the partitions. When the box frames are lifted, usable space is exposed between the floor pieces and the sub-floor pieces. This space can be used for storage.

BRIEF DESCRIPTION OF THE DRAWINGS

A more particular description of the invention briefly described above is made below by reference to specific embodiments depicted in drawings included with this application, in which.

DETAILED DESCRIPTION

A detailed description of the claimed invention is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

Figure 1:
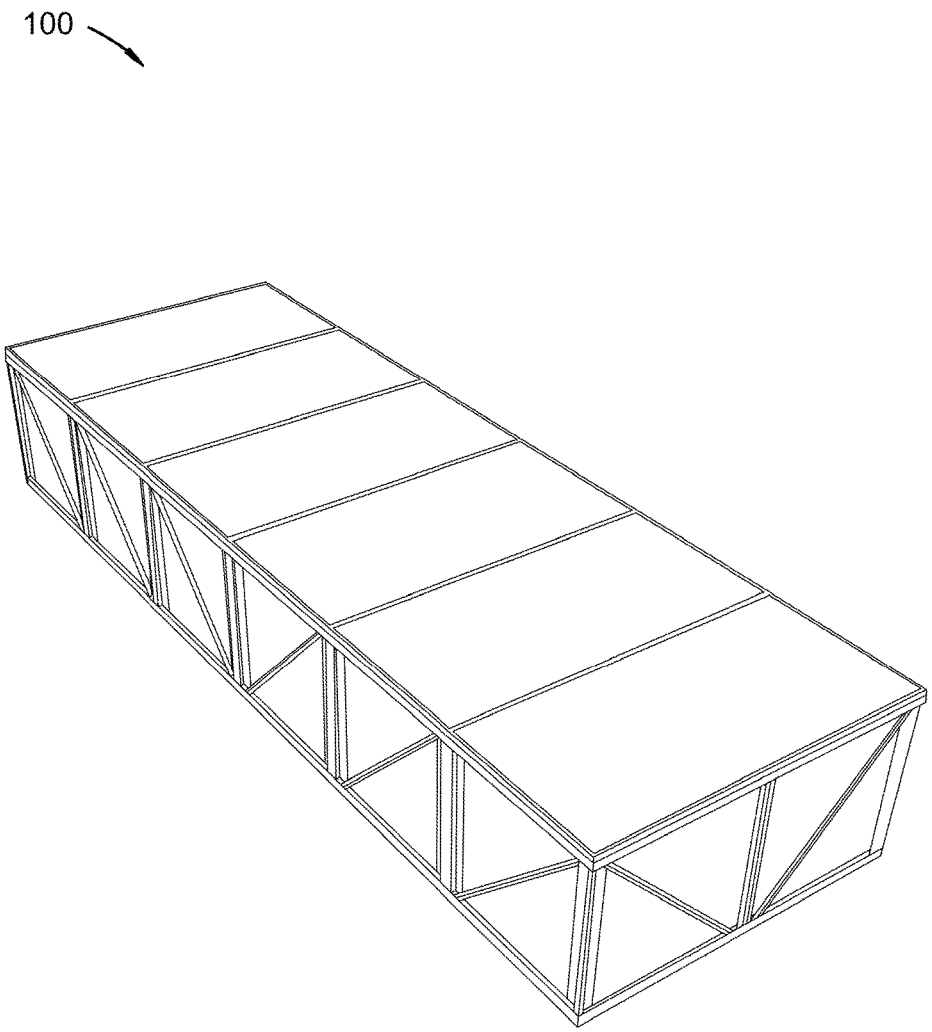
FIG. 1 depicts one embodiment of the modular building component, which comprises a prismatic box structure.

FIG. 1 depicts one embodiment of the modular building component, which comprises a prismatic box structure 100. A prismatic box structure is a frame structure that has a prismatic geometrical configuration, preferably a rectangular prismatic or cubic configuration, and a hollow interior. The prismatic box structure 100 comprises length and width dimensions that are multiples of one-half rod. In one embodiment, the length dimension is one and one-half rods. In one embodiment, the width dimension is one-half of a rod. In one embodiment, the prismatic box structure 100 is one-fourth of a rod in height. A plurality of the prismatic box structures 100 are placed side by side horizontally to create a ceiling and a floor with rod-based dimensions, the ceiling and floor being components of a building with rod-based dimensions. A plurality of the buildings with rod-based dimensions are placed side by side to fill equal portions of an entire width of a perfect-acre lot.

Figure 2:
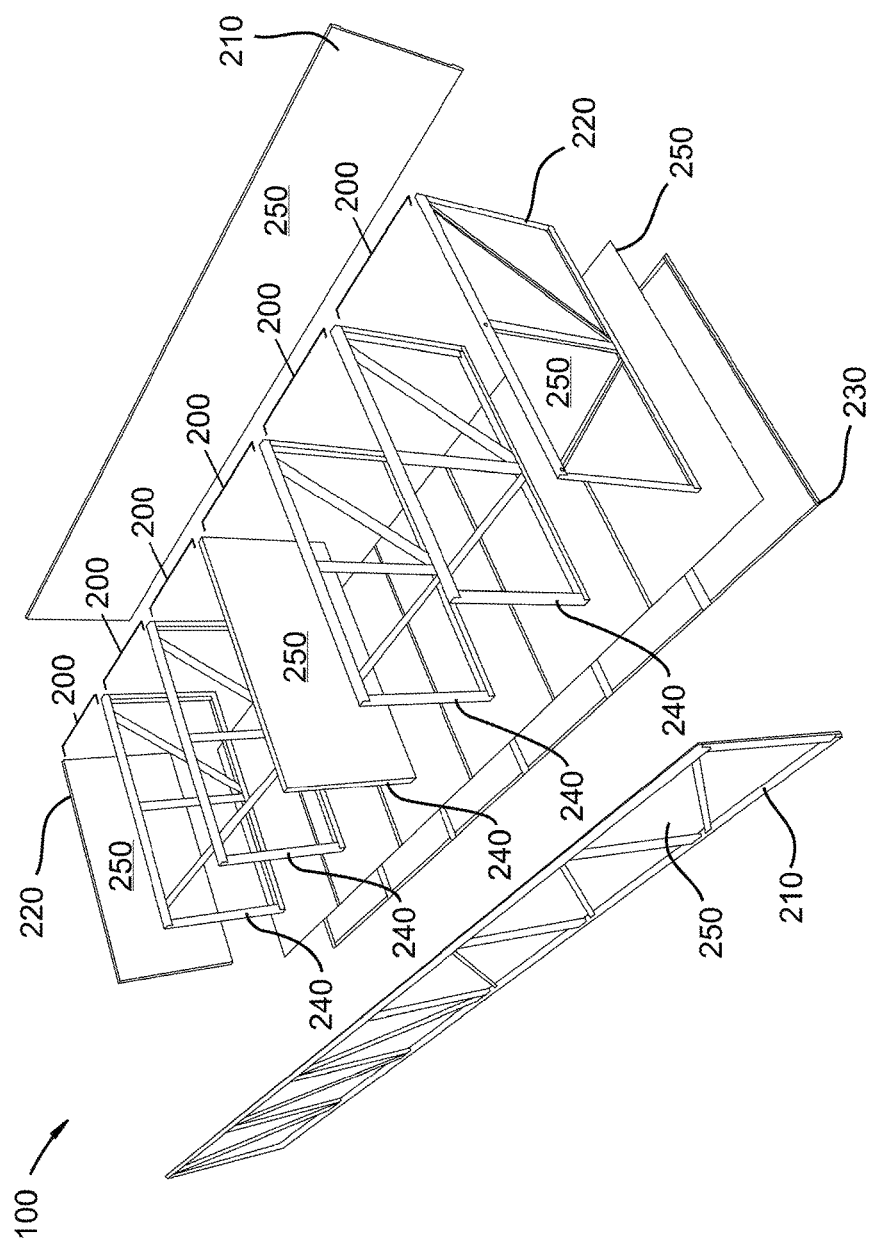
FIG. 2 depicts a blown-up view of one embodiment of a prismatic box structure.

FIG. 2 depicts a blown-up view of one embodiment of a prismatic box structure 100. The prismatic box structure 100 is modular. In one embodiment, the prismatic box structure 100 comprises flat-packable components, such that the components can be mass produced, easily shipped, and then quickly assembled to create a prismatic box structure 100, and a plurality of prismatic box structures 100 can then be transferred to a building site and quickly assembled on site to form a building. In one embodiment, the flat-packable components comprise strategically placed holes that do not affect their structural integrity but that allow them to be constructed remotely by means of spot welding. Each of the pre-constructed, flat-packable components (trusses and frames) can then be shipped to the construction site and assembled with bolts and screws.

In one embodiment, each prismatic box structure 100 comprises two long trusses 210, two outer bulkhead trusses 220, and a base frame 230 arranged in a rectangular prismatic configuration. In one embodiment, the long trusses 210 comprise a perimeter, which is formed from hollow structural steel tubes, and crossbeams comprising flat pieces of steel bent into Z-shapes or hat-shapes; the bulkhead trusses 220 comprise thin sheets of steel bent into U-shaped channels; and the base frame 230 also comprises steel. Other embodiments comprise other materials, such as other metals, wood, engineered wood products, or plastic. In one embodiment, a plurality of inner bulkhead trusses 240 divide the prismatic box structure 100 into two or more equal partitions 200. Preferably, each partition 200 comprises a rectangular prismatic configuration. Preferably, the prismatic box structure 100 comprises six equal partitions 200. In one embodiment, each partition 200 measures one-fourth of a rod long (one-sixth of the length of a one and one-half rods long prismatic box structure 100) and the prismatic box structure 100 is one-fourth of a rod high. In this embodiment, the length and height dimensions of each partition 200 form a perfect square, and the crossbeams of the long trusses 210 can cut each perfect square in half at a perfect 45-degree angle, thereby providing the maximum strength. In one embodiment, each inner bulkhead truss 240 or outer bulkhead truss 220 is one-fourth rod high and one-half rod long, but the length of each truss is divided in half by a crossbeam, forming two one-fourth rod portions. The height and length dimensions of each portion then also forms a perfect square, such that crossbeams of the trusses also form 45-degree angles, thereby providing the maximum strength. These sizes for the trusses also nearly correspond to the standard size of many building materials, which are measured in multiples or factors of four feet. Therefore, with slight space for utility easements between pieces, these non-standard sizes can be constructed from standard materials without awkward alterations necessitated given the only slightly larger size.

In one embodiment, the prismatic box structure 100 comprises one or more walls comprising sound-attenuating materials 250. In one embodiment, the long trusses 210, the outer bulkhead trusses 220, and the base frame 230 are lined with sound-attenuating materials 250. In one embodiment, one or more of the inner bulkhead trusses 240 are also lined with sound-attenuating materials 250. The sound-attenuating materials 250 may comprise mass loaded vinyl or mass loaded vinyl on top of foam. In one embodiment, the prismatic box 100 structure is covered on the top with a floor. In another embodiment, the prismatic box structure 100 comprises one or more box frames 370 that lift from within each partition 200, as depicted in FIG. 3A, and each box frame 370 comprises a floor piece, as depicted in FIG. 3F, which covers the prismatic box structure 100.

Figure 3A:
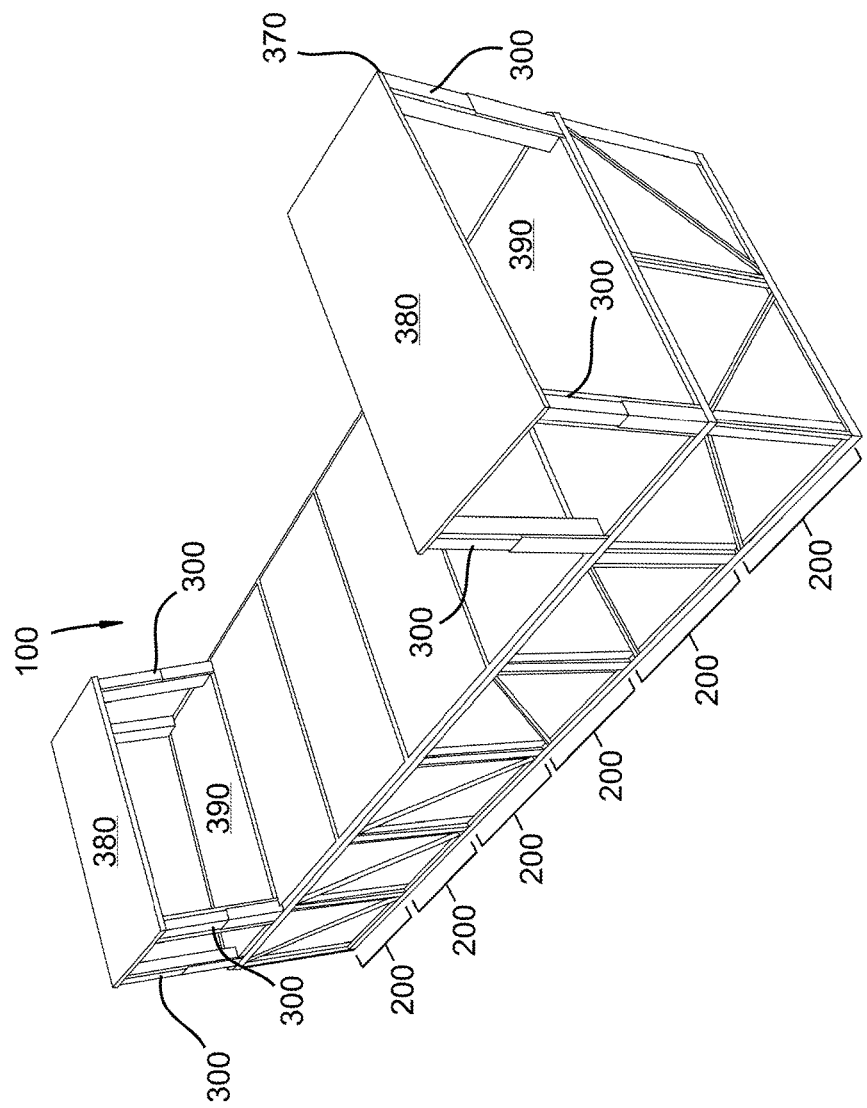
FIG. 3A depicts one embodiment of a prismatic box structure comprising two or more equal partitions, wherein each partition comprises a box frame that nests removably inside the partition, and each box frame is lifted from inside each partition by means of one or more automatic lifting devices.

FIG. 3A depicts one embodiment of a prismatic box structure 100 comprising two or more equal partitions 200, wherein each partition 200 comprises a box frame 370 that nests removably inside the partition 200, and each box frame 370 is lifted from inside each partition 200 by means of one or more automatic lifting devices 300. In one embodiment, the prismatic box structure 100 comprises two or more equal partitions 200. Preferably, the prismatic box structure 100 comprises six equal partitions 200.

In one embodiment, each partition 200 comprises one or more automatic lifting devices 300. In one embodiment, the one or more automatic lifting devices 300 comprise lifting columns. The one or more automatic lifting devices 300 may, in some embodiments, be selected from a group comprising telescoping rods, hydraulic and pneumatic telescoping systems, air bags, scissor lifts, pulley systems, linear actuators, and rack and pinion devices. In one embodiment, each partition 200 comprises four automatic lifting devices 300 and each of the four automatic lifting devices 300 is secured in one of four corners of the partition 200. The one or more automatic lifting devices 300 in each partition 200 may be synchronized, or actuated simultaneously. In one embodiment, the one or more automatic lifting devices 300 in each partition 200 are connected to a microcontroller. The microcontroller may be in communication with a central controller. The central controller may receive user inputs that allow a user to control when the one or more automatic lifting devices 300 of each partition 200 are actuated. The user interface may comprise voice control, buttons, or a touch-sensitive display on a mobile device.

In one embodiment, each partition 200 comprises a box frame 370 that nests removably inside the partition 200 and that is lifted from inside the partition 200 by means of the one or more automatic lifting devices 300. A box frame is a structural frame with a rectangular prismatic or cubic configuration, a hollow interior, a floor piece, and a sub-floor piece. Each box frame 370 comprises a floor piece 380 (mounted atop the box frame 370) and a sub-floor piece 390 (mounted to a bottom of the box frame 370). The box frame 370 may or may not have walls. Preferably, each box frame 370 has an identical configuration to that of each partition 200 in which it nests, and each box frame 370 fits snuggly within each partition 200. In one embodiment, space between each box frame 370 and the inner boundary of each partition 200 is less than approximately one inch along every side. In one embodiment, each box frame 370 measures slightly less than one-fourth of a rod in height, one-fourth of a rod in length, and one half of a rod in width. In one embodiment, each box frame 370 comprises thin sheets of steel bent into beams and crossbeams, welded and bolted together, with a top and bottom dimensioned and designed to hold the floor piece 380 and the sub-floor piece 390 respectively. In one embodiment, corners of each box frame 370 point inward, leaving an indentation where the one or more automatic lifting devices 300 can fit and attach to the floor piece 380.

In one embodiment, the one or more automatic lifting devices 300 in each partition 200 are attached to the floor piece 380 of each box frame 370. When the one or more automatic lifting devices 300 are actuated, the one or more automatic lifting devices 300 thereby lift the floor piece 380 of the box frame 370. In one embodiment, the one or more automatic lifting devices 300 are attached underneath the floor piece 380, and they are attached to and lift only the floor piece 380 and no other part of the box frame 370. In this embodiment, the rest of the box frame 370 hangs from the floor piece 380, so that the box frame 370 also lifts with the floor piece 380, when the one or more automatic lifting devices 300 lift the floor piece 380. The one or more automatic lifting devices 300 may be attached to the floor piece 380 by means of bolts or screws. In other embodiments, the one or more automatic lifting devices 300 may be attached beneath the whole box frame 370, lifting the box frame 370 from the bottom. In other embodiments, the one or more automatic lifting devices 300 may be attached to and lift the box frame 370 from the sides or corners.

In one embodiment, usable space is exposed between the floor piece 380 and the sub-floor piece 390 of the box frame 370 when the box frame 370 is lifted from inside each partition 200 by means of the one or more automatic lifting devices 300. In one embodiment, the usable space is used for storage. The size within the box frame 370, which is preferably nearly one-fourth rod by one-fourth rod by one-half rod, enables each box frame 370 to house a variety of objects, including large ones. In one embodiment, the usable space is used for storing household appliances. In another embodiment, the usable space stores household furniture, such as tables, chairs, couches, lamps, desks, dressers, shelves, benches, beds, and ottomans. In other embodiments, the usable space stores any of a variety of other things capable of fitting and being lifted within the box frame 370. The one or more automatic lifting devices 300 lift each box frame 370 and any contents of the usable space within the box frame 370 from inside each partition 200 of the prismatic box structure 100. Having box frames 370 nesting inside each partition 200 of each prismatic box structure 100 is desirable because it makes a building constructed with the invented modular building components more sustainable given that all of the space within the building frame can be used beneficially.

Figure 3B:
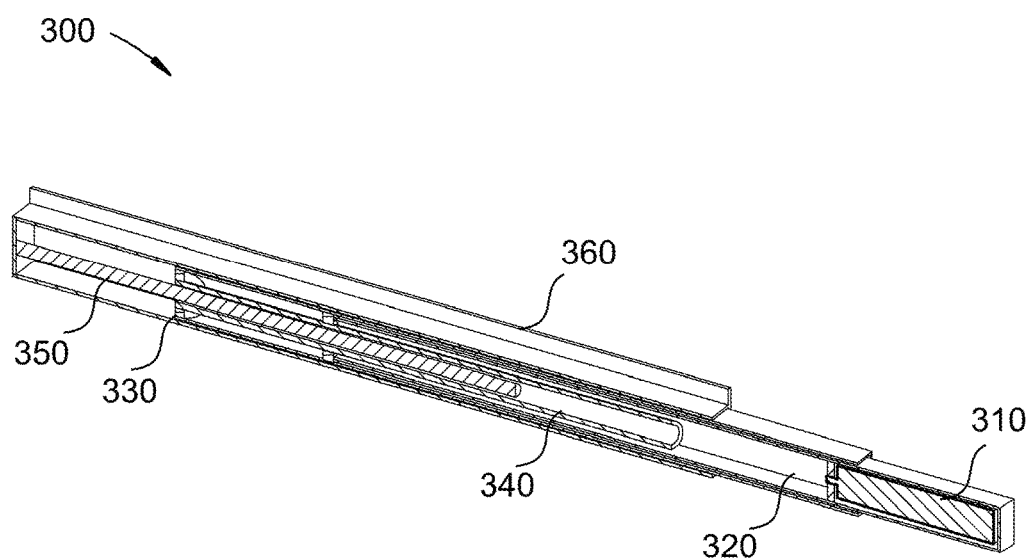
FIG. 3B depicts one embodiment of an automatic lifting device.

FIG. 3B depicts one embodiment of an automatic lifting device 300. In some embodiments, the one or more automatic lifting devices 300 are selected from a group comprising telescoping rods, hydraulic and pneumatic telescoping systems, air bags, scissor lifts, pulley systems, linear actuators, and rack and pinion devices. In another embodiment, the one or more automatic lifting devices 300 comprise lifting columns, as depicted in FIG. 3B.

A lifting column is a linear actuator with a stable guide. In one embodiment, a lifting column comprises a motor 310. The motor 310 is completely hidden from outside view by a frame 360. The motor 310 is attached to and rotates a hollow tube 320, preferably made of metal and in a hexagonal configuration. The hollow tube 320 comprises a nut 330. The nut 330 encircles a large threaded screw 340 that is disposed within the hollow tube 320. The large threaded screw 340 is also hollow, and a small threaded screw 350 is disposed within the large threaded screw 340. The rotation of the hollow tube 320 and nut 330 by means of the motor 310 causes the hollow tube 320 to rise, crawling up the threads of the large threaded screw 340. The large threaded screw 340 interfaces with the small threaded screw 350 such that the large threaded screw 340 rises too, crawling up the threads of the small threaded screw 350. The rising hollow tube 320 and large threaded screw 340 are enclosed by the housing 360, which rises with them in tiers, each tier rising higher than the last. In one embodiment, the lifting column has three tiers.

In one embodiment, the prismatic box structure 100 comprises two or more equal partitions 200, and each partition 200 comprises one or more automatic lifting devices 300. In one embodiment, each partition 200 comprises four automatic lifting devices 300 and each of the four automatic lifting devices 300 is secured in one of four corners of the partition 200. In one embodiment, each partition 200 comprises a box frame 370 that nests removably inside the partition 200 and that is lifted from inside the partition 200 by means of the one or more automatic lifting devices 300.

Figure 3C:
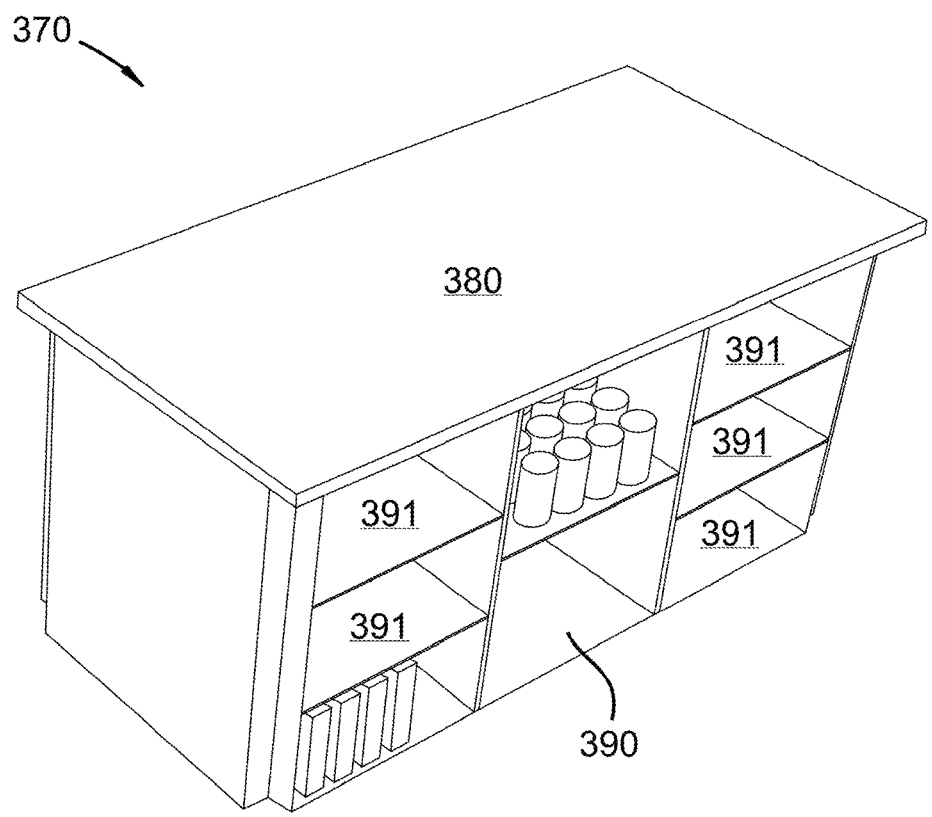
FIG. 3C depicts one embodiment of a box frame that nests removably inside one partition of the prismatic box structure, wherein the box frame comprises an interior organizational system comprising shelving.
Figure 3D:
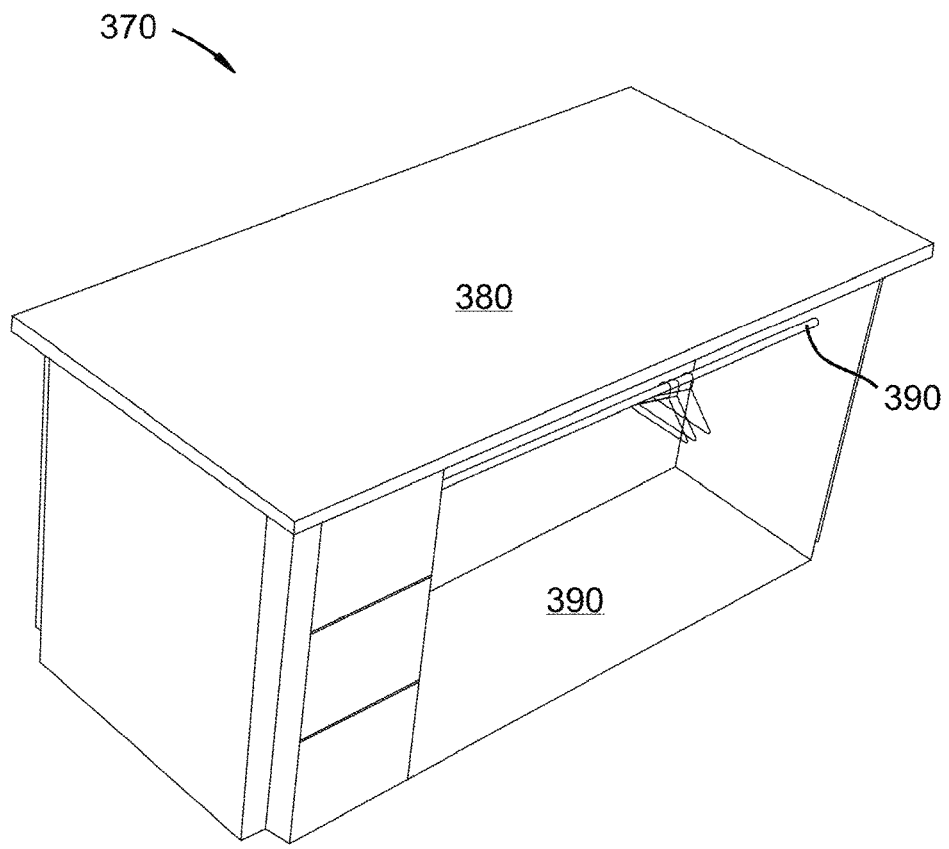
FIG. 3D depicts one embodiment of a box frame that nests removably inside one partition of the prismatic box structure, wherein the box frame comprises an interior organizational system comprising hanging rods.
Figure 3E:
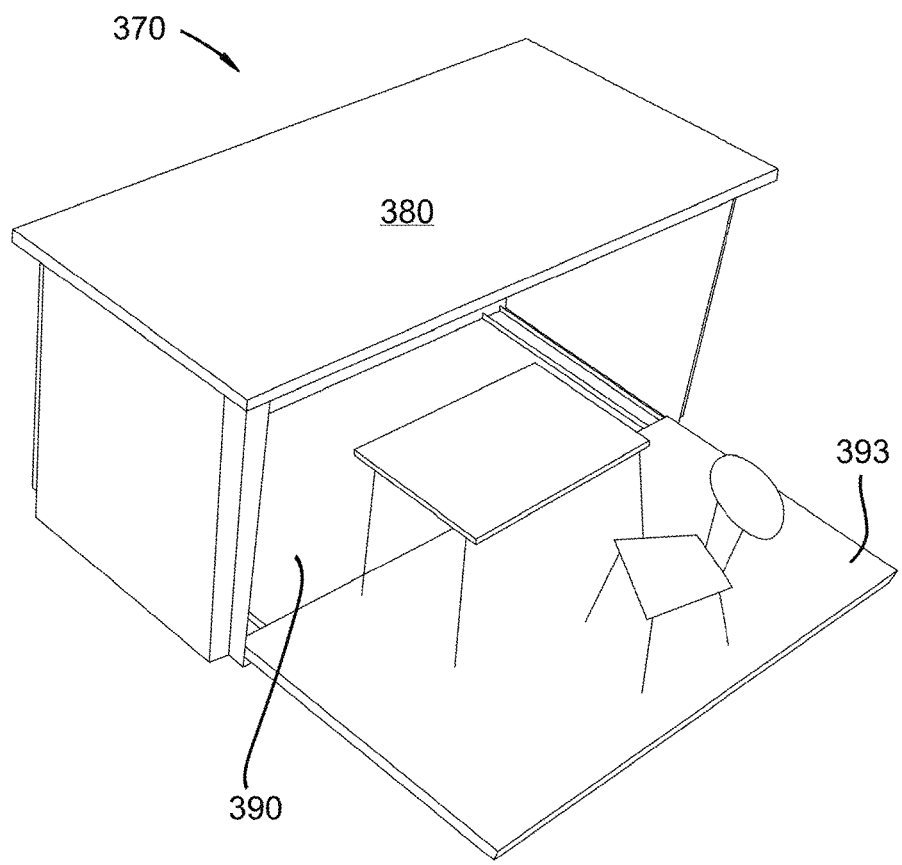
FIG. 3E depicts one embodiment of a box frame that nests removably inside one partition of the prismatic box structure, wherein the box frame comprises an interior organizational system comprising slide-out floors.
Figure 3F:
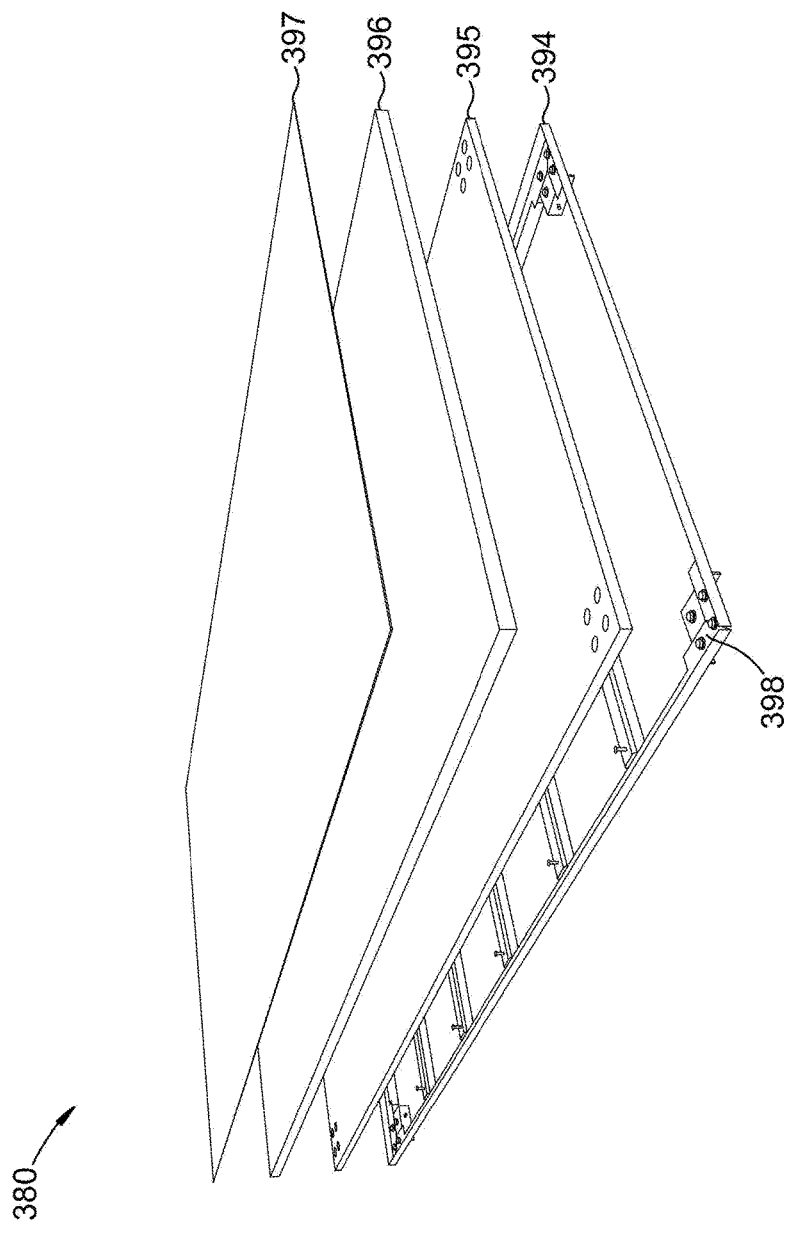
FIG. 3F depicts an exploded view of one embodiment of a floor piece of a box frame.

FIGS. 3C-3E depict embodiments of a box frame 370 that nests removably inside one partition 200 of the prismatic box structure 100, wherein the box frame 370 comprises an interior organizational system. Each box frame 370 comprises a floor piece 380 and a sub-floor piece 390. In one embodiment, between each floor piece 380 and sub-floor piece 390 usable space is exposed when the box frame 370 is lifted. In some embodiments, the usable space comprises an interior organizational system. In one embodiment, the box frame 370 comprises shelving 391. FIG. 3C depicts this embodiment. In one embodiment, the box frame 370 comprises hanging rods 392. FIG. 3D depicts this embodiment. In one embodiment, the box frame 370 comprises slide-out floors 393. FIG. 3E depicts this embodiment.

FIG. 3F depicts an exploded view of one embodiment of a floor piece 380 of a box frame 370. Each box frame 370 comprises a floor piece 380 mounted atop the box frame 370. In one embodiment, the floor piece 380 comprises a skeleton framework 394 comprising steel beams shaped and dimensioned to hold a floor. In one embodiment, on top of the skeleton framework 394 is a rigid panel 395 that can hold substantial weight, preferably comprising oriented strand board (OSB), but alternatively comprising wood or other engineered wood products. In one embodiment, the floor piece 380 of each box frame 370 also comprises anti-fatigue flooring 396, such as SmartCells, on top of the rigid panel 395. In one embodiment, the anti-fatigue flooring 396 is also topped by a finishing layer 397. The finishing layer 397 may comprise wood veneer, vinyl, tiling, laminate, carpet, or other types of flooring commonly known in the art. In one embodiment, the floor piece 380 also comprises connectors 398 where the one or more automatic lifting devices 300 can attach to the floor piece 380. In one embodiment, the prismatic box structure 100 is covered with a floor that is structured similarly to the floor piece 380 described here, when no box frames 370 are present. In another embodiment, the floor piece 380 of each box frame 370 combines to create the floor, which is the top cover of each prismatic box structure 100.

Figure 4:
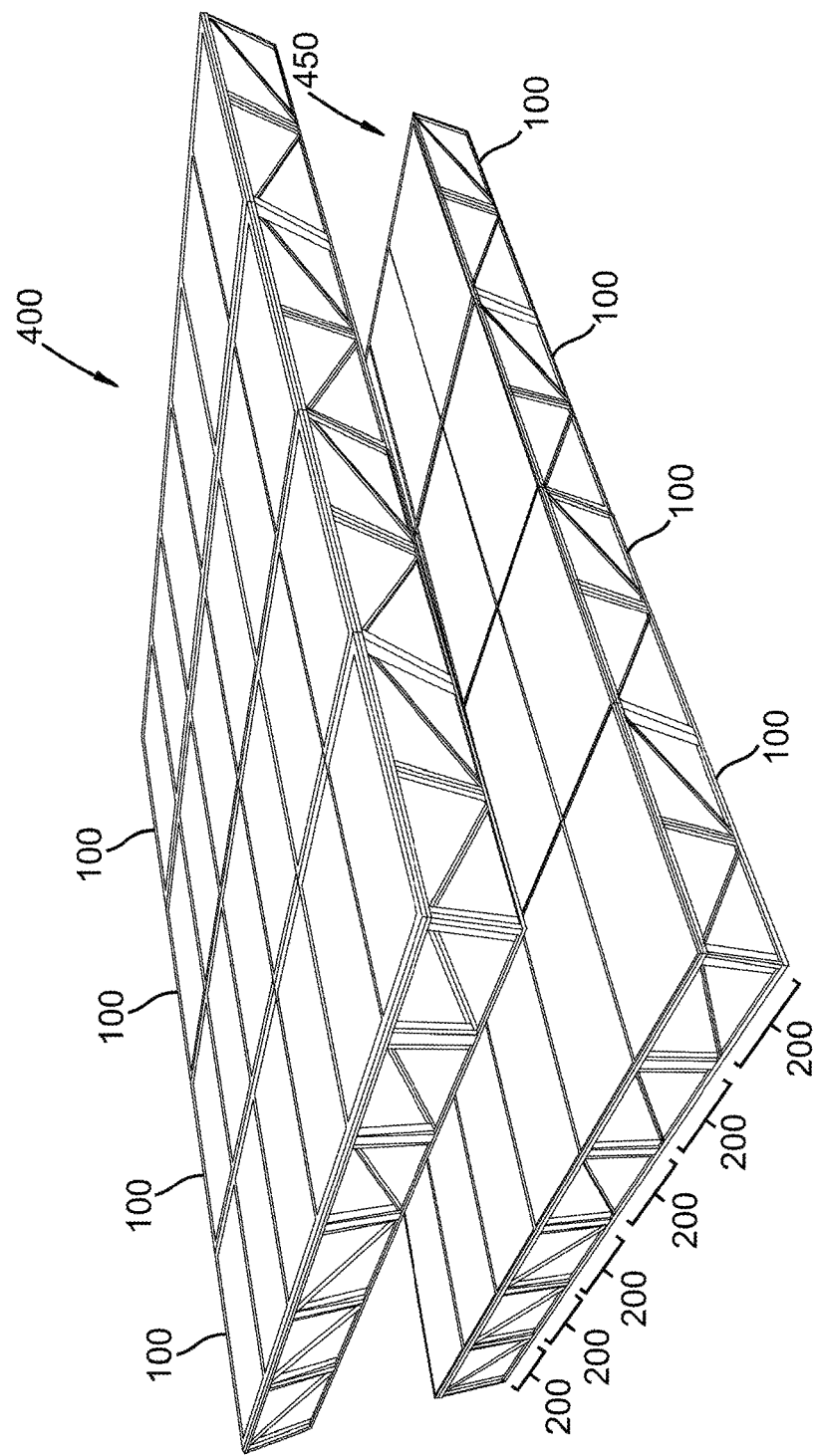
FIG. 4 depicts one embodiment of a plurality of prismatic box structures placed side by side horizontally to create a ceiling and a floor with rod-based dimensions.

FIG. 4 depicts one embodiment of a plurality of prismatic box structures 100 placed side by side horizontally to create a ceiling 400 and a floor 450 with rod-based dimensions. In one embodiment, the ceiling 400 and the floor 450 are identical in shape and size. In one embodiment, the ceiling 400 and the floor 450 each comprise four prismatic box structures 100 placed side by side horizontally. In one embodiment, the ceiling 400 and the floor 450 each have a width of one and one-half rods and a length of two rods. In one embodiment, each prismatic box structure 100 is connected to the other prismatic box structures 100 placed side by side horizontally next to it by means of bolts or screws. In one embodiment, each prismatic box structure 100 comprises two or more equal partitions 200. In one embodiment, each partition 200 comprises a box frame 370 comprising a floor piece 380 and a sub-floor piece 390 that nests removably inside the partition 200, and the box frame 370 is lifted from inside each partition 200 by means of one or more automatic lifting devices 300. In one embodiment, usable space is exposed between the floor piece 370 and the sub-floor piece 380 when the box frame 370 is lifted from inside the partition 200. In this way, usable space is made available within both the ceiling 400 and the floor 450, which can be used for storing items, such as household appliances, furniture, rooftop gardens, etc.

Figure 5A:
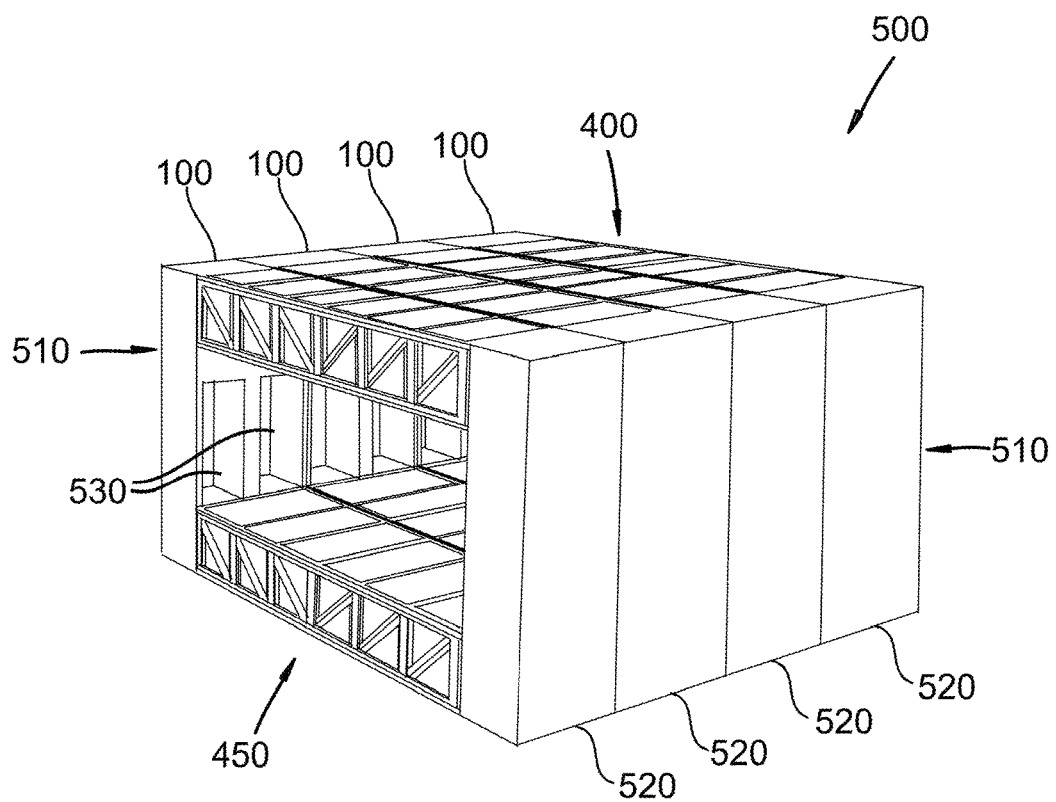
FIG. 5A depicts one embodiment of a ceiling and a floor with rod-based dimensions created from a plurality of prismatic box structures placed side by side horizontally, and the ceiling and the floor being components of a building with rod-based dimensions.
Figure 5B:
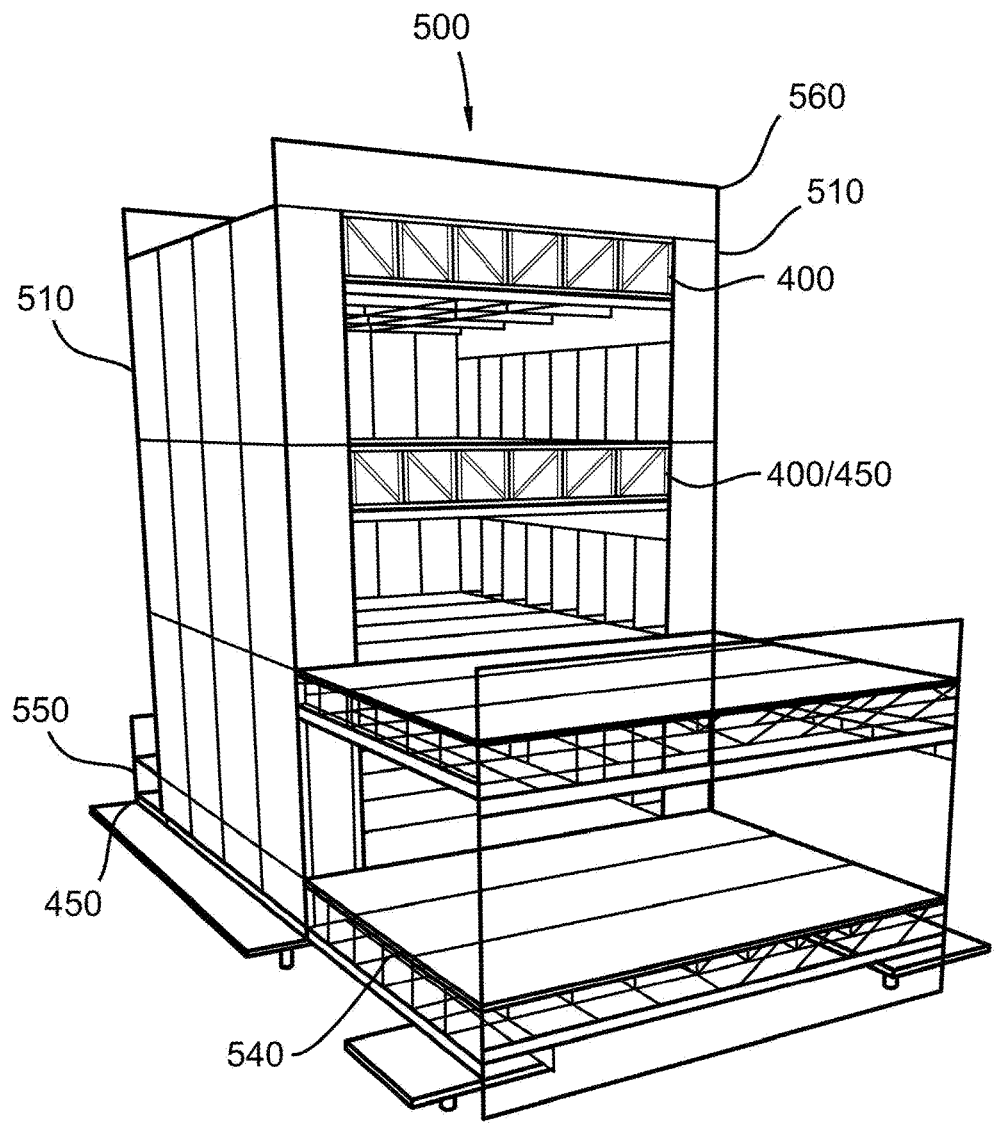
FIG. 5B depicts one embodiment of a ceiling and a floor with rod-based dimensions created from a plurality of prismatic box structures placed side by side horizontally, and the ceiling and the floor being components of a building with rod-based dimensions.

FIG. 5A and FIG. 5B depict embodiments of a ceiling 400 and a floor 450 with rod-based dimensions created from a plurality of prismatic box structures 100 placed side by side horizontally, and the ceiling 400 and the floor 450 being components of a building with rod-based dimensions 500. In one embodiment, the ceiling 400 and the floor 450 are identical in shape and size, each comprising four prismatic box structures 100 placed side by side horizontally. In this embodiment, the ceiling 400 and the floor 450 each have a width of one and one-half rods and a length of two rods. In one embodiment, the building with rod-based dimensions 500 also comprises one or more walls 510. In one embodiment, the building with rod-based dimensions 500 comprises two walls 510. In one embodiment, the two walls 510 are positioned adjacent to the ceiling 400 and the floor 450 on two opposite sides of the ceiling 400 and the floor 450, preferably touching the outer bulkhead trusses 220 of each prismatic box structure 100, along the edges of the ceiling 400 and the floor 450 that measure two rods long, as depicted in FIG. 5A. In one embodiment, each wall 510 is one-fourth of a rod long. In this embodiment, the building with rod-based dimensions 500 is perfectly square, measuring two rods in length and two rods in width, given that the ceiling 400 and the floor 450 are two rods long, and the ceiling 400 and the floor 450 are one and one-half rods wide, but are flanked by two walls 510, each measuring one-fourth of a rod in width, which creates a sum of two rods in width for the building with rod-based dimensions 500. In other embodiments, the building with rod-based dimensions 500 may comprise more than two walls. In one embodiment, the ceiling 400 is not supported from underneath by the one or more walls 510. In one embodiment, the one or more walls 510 are attached to the ceiling 400 and the floor 450 at the side by means of bolts or screws. In one embodiment, the one or more walls 510 comprise one or more vertical modules 520. In one embodiment, each vertical module 520 is one-fourth of a rod wide, one-half of a rod long, and fourteen feet high. In one embodiment, each vertical module 520 is divided into two compartments 530. In one embodiment, one compartment 530 holds a compact kitchen, and the other compartment 530 holds a compact bathroom. In one embodiment, each vertical module 520 comprises thin sheets of metal, preferably steel, and sound-attenuating materials, such as mass-loaded vinyl.

In one embodiment, the building with rod-based dimensions 500 has a patio in the front and a patio in the back, as depicted in FIG. 5B. In one embodiment, the front patio 540 is one and one-half rods long, and the back patio 550 is one-half of a rod long, such that the patios together comprise two rods, and the building with rod-based dimensions 500 together with the front patio 540 and the back patio 550 is four rods long. In one embodiment, the building with rod-based dimensions 500 is more than one story high. In one embodiment, the building with rod-based dimensions 500 is three stories high. In embodiments with more than one story, multiple ceilings 400 and floors 450 are needed. Each prismatic box structure 100 can be part of a ceiling 400 and a floor 450 at the same time in the central stories. In one embodiment, the building with rod-based dimensions 500 comprises two walls 510. In this embodiment, the other two sides of the building with rod-based dimensions 500 may be enclosed by means of façade walls 560. In certain embodiments, the building with rod-based dimensions 500 may comprise other features, such as rooftop gardens, glass walls, retractable interior barriers, and automated storage facilities, etc. The usable space inside all of the ceilings 400 and floors 450 and walls 510 of the building with rod-based dimensions 500, which comprises the invented prismatic box structures 100, makes the building highly sustainable, because no space is wasted.

Figure 6:
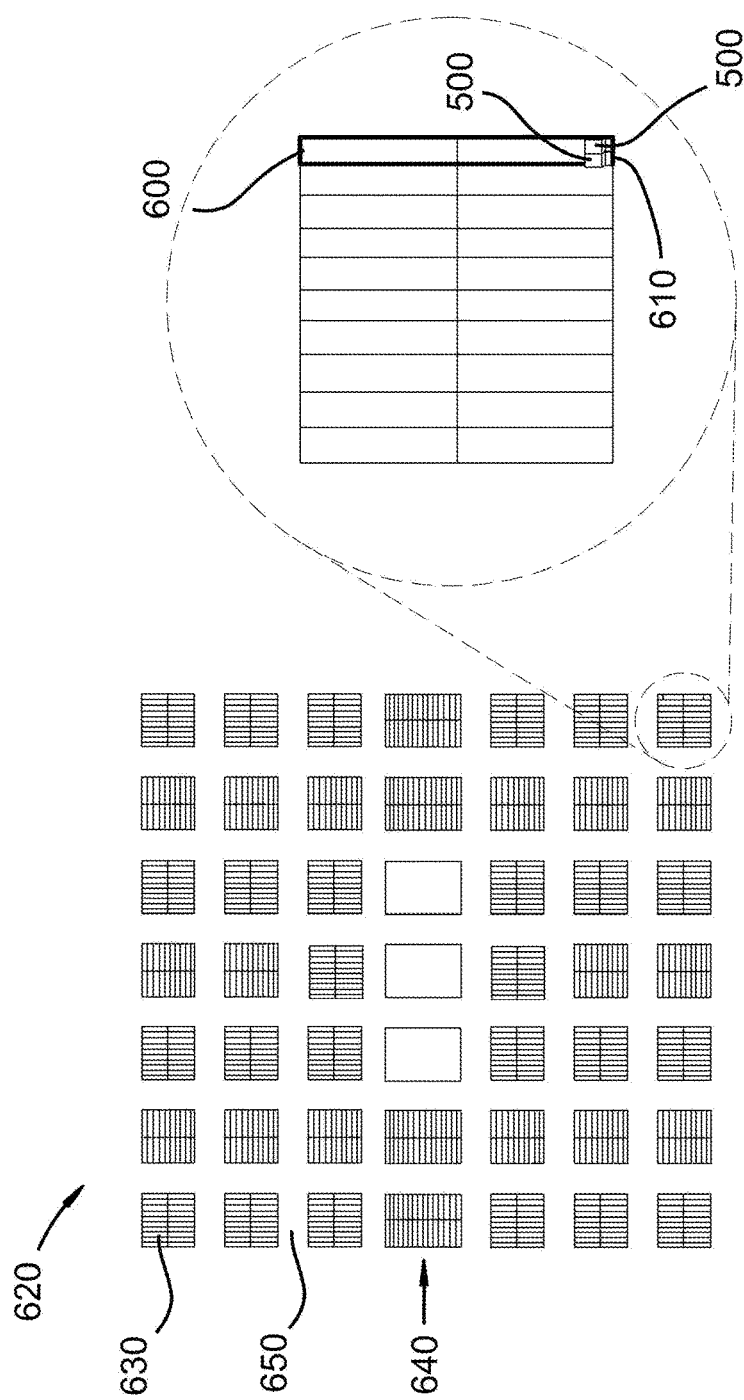
FIG. 6 depicts one embodiment of a plurality of buildings with rod-based dimensions placed side by side to fill equal portions of an entire width of a perfect-acre lot.

FIG. 6 depicts one embodiment of a plurality of buildings with rod-based dimensions 500 placed side by side to fill equal portions of an entire width of a perfect-acre lot 600. A perfect-acre lot is a one-acre lot in a rectangular configuration, with length and width dimensions of 40 rods by 4 rods, respectively. In one embodiment, two buildings with rod-based dimensions 500 are placed side by side to fill equal portions of an entire width of a perfect-acre lot 600. In one embodiment, each of the plurality of buildings with rod-based dimensions 500 have identical dimensions. In one embodiment, each building with rod-based dimensions 500 is 2 rods wide, such that two buildings with rod-based dimensions 500 placed side by side fill the entire 4-rod width of the perfect-acre lot 600. In one embodiment, each building with rod-based dimensions 500 is 2 rods long. In one embodiment, each building with rod-based dimensions 500 has a front patio 540 and a back patio 550. In one embodiment, the front patio 540 is one and one-half rods long, and the back patio 550 is one-half of a rod long, such that the patios together comprise two rods, and the building with rod-based dimensions 500 together with the front patio 540 and the back patio 550 is four rods long. In one embodiment, the plurality of buildings with rod-based dimensions 500 abut the front boundary 610 of the perfect-acre lot 600, and the other approximately thirty-six rods of open space behind the plurality of buildings with rod-based dimensions 500 are contiguous and available for use. In some embodiments, the open space may be used for gardens, yards, barns, pools, exercise facilities, or community squares. In one embodiment, each perfect-acre lot 600 is divided into two half-acre lots with dimensions of 20 rods by 4 rods. In this embodiment, each half-acre lot comprises a plurality of buildings with rod-based dimensions 500 placed side by side to fill equal portions of the entire width of each half of the perfect-acre lot, and the plurality of buildings with rod-based dimensions 500 abut the front boundary 610 of each half-acre lot, and the approximately sixteen rods of open space behind the plurality of buildings with rod-based dimensions 500 are contiguous and available for use.

In one embodiment, the perfect-acre lot 600 is part of a larger city plat 620 for a sustainable community. In one embodiment, the city plat 620 has a square grid pattern, and the grid is based in acres and rods. It is customary to measure plots of land in acres, and acres divide evenly into rods, leading to the rod-based grid. The city plat 620 is divided along the grid into even rows and columns of square 10-acre lots 630, each square 10-acre lot 630 measuring 40 rods by 40 rods. Each square 10-acre lot 630 is subsequently divided into 10 perfect-acre lots 600, each measuring 4 rods by 40 rods. Each perfect-acre lot 600 may be further divided in half, such that each square 10-acre lot 630 is divided into 20 half-acre lots, each measuring 4 rods by 20 rods. A central row of lots 640 may be larger than the other square 10-acre lots 630, the central row of lots 640 including 15 acres and measuring 40 rods by 60 rods. These larger lots in the central row of lots 640 may also be divided into perfect-acre lots 600 and then half-acre lots or they may be used for larger public squares or public buildings. The square 10-acre lots 630 and the central row of lots 640 are all separated from each other by wide streets 650 that measure 8 rods across. Surrounding the city plat 620 on an outer periphery are open spaces designated for agriculture. This city plat 620 provides for a high-density community contained within a slightly-larger-than-one-mile space with equitable land divisions all within walking distance, wide streets, and surrounding areas of open space, leading to a high degree of sustainability. The buildings with rod-based dimensions 500 that fit within this city plat 620 also promote a higher degree of sustainability given that they fit neatly and evenly within the lots, and also given that, within the buildings, no space is wasted. The invented modular building components with rod-based dimensions allow the buildings with rod-based dimensions 500 to be quickly and easily assembled because of the rod-based dimensions, which are convenient dimensions given that they divide evenly into the dimensions of the perfect-acre lots 600.

Figure 7:
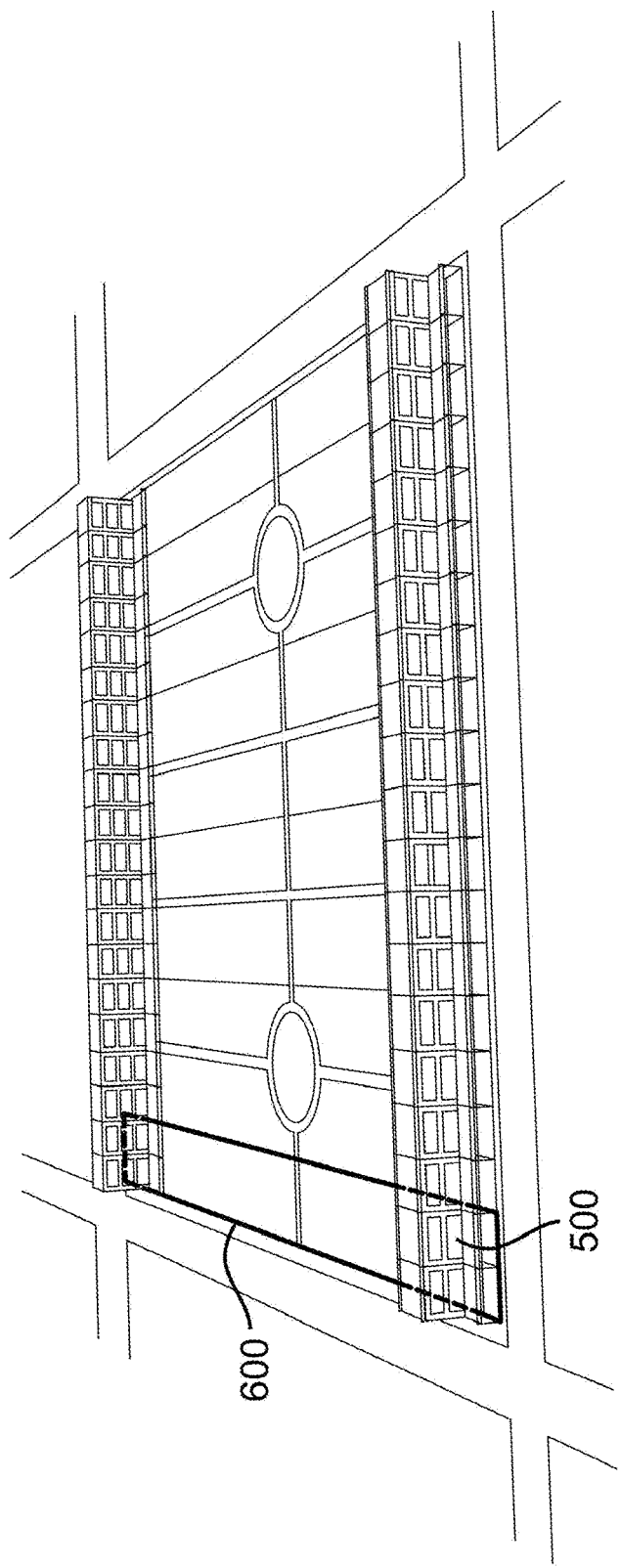
FIG. 7 depicts a community comprising a plurality of buildings with rod-based dimensions placed side by side to fill equal portions of each of a plurality of perfect-acre lots.

FIG. 7 depicts a community comprising a plurality of buildings with rod-based dimensions 500 placed side by side to fill equal portions of each of a plurality of perfect-acre lots 600. In one embodiment, two buildings with rod-based dimensions 500 are placed side by side to fill equal portions of an entire width of one perfect-acre lot 600, and a string of perfect-acre lots 600 in a row each have two buildings with rod-based dimensions 500 placed side by side filling equal portions of the entire width of each perfect-acre lot 600. In this way, the buildings with rod-based dimensions 500 span across several perfect-acre lots 600 with no open space between the buildings, such that no space is wasted. In one embodiment, each of the plurality of buildings with rod-based dimensions 500 have identical dimensions. In one embodiment, open space behind the buildings with rod-based dimensions 500 is contiguous and can be used for gardens, yards, barns, pools, exercise facilities, or community squares.

The invention claimed is:

1. A modular building component comprising:
a prismatic box structure comprising two or more equal partitions, each partition comprising one or more automatic lifting devices and a box frame that nests removably inside the partition and that is lifted from inside the partition by means of the one or more automatic lifting devices,
and the prismatic box structure further comprising length and width dimensions that are multiples of one-half rod, such that a plurality of the prismatic box structures can be placed side by side horizontally to create a ceiling and a floor with rod-based dimensions, the ceiling and the floor being components of a building with rod-based dimensions,
and a plurality of the buildings with rod-based dimensions being placed side by side to fill equal portions of an entire width of a perfect-acre lot.

2. The modular building component of claim 1, wherein the length dimension is one and one-half rods.

3. The modular building component of claim 1, wherein the width dimension is one-half of a rod.

4. The modular building component of claim 1, wherein the building with rod-based dimensions is two rods wide.

5. The modular building component of claim 1, wherein the building with rod-based dimensions is two rods long.

6. The modular building component of claim 5, wherein the building with rod-based dimensions has a patio in the front that is one and one-half rods long and a patio in the back that is one-half of a rod long.

7. The modular building component of claim 1, wherein the ceiling and the floor are identical in shape and size.

8. The modular building component of claim 1, wherein the ceiling and the floor each comprise four prismatic box structures placed side by side horizontally.

9. The modular building component of claim 1, wherein the one or more automatic lifting devices comprise lifting columns.

10. The modular building component of claim 1, wherein the one or more automatic lifting devices are selected from a group comprising telescoping rods, hydraulic and pneumatic telescoping systems, air bags, scissor lifts, pulley systems, linear actuators, and rack and pinion devices.

11. The modular building component of claim 1, wherein each box frame comprises a floor piece and a sub-floor piece.

12. The modular building component of claim 11, wherein usable space is exposed between the floor piece and the sub-floor piece when the box frame is lifted from inside the partition.

13. The modular building component of claim 1, wherein the prismatic box structure comprises flat-packable components.

14. The modular building component of claim 1, wherein the prismatic box structure comprises one or more walls comprising sound-attenuating materials.

15. The modular building component of claim 1, wherein the ceiling and the floor have a width of one and one-half rods and a length of two rods.

16. The modular building component of claim 1, wherein two buildings with rod-based dimensions are placed side by side to fill equal portions of an entire width of a perfect-acre lot.

17. The modular building component of claim 1, wherein the prismatic box structure comprises lightweight steel.

18. The modular building component of claim 1, wherein the prismatic box structure is one-fourth of a rod in height.

* * * * *